J. M. Kellogg,
Upsetting Tires,
Nº 50,716.  Patented Oct. 31, 1865.
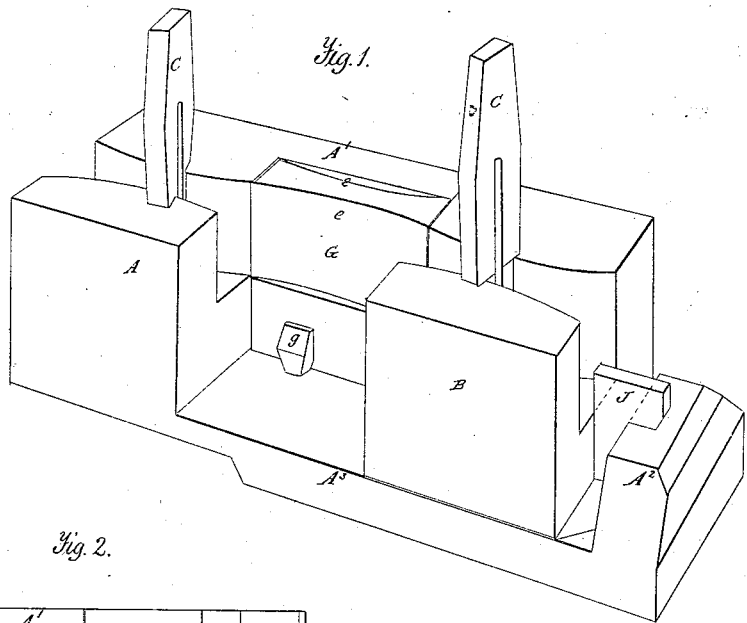
Fig. 1.
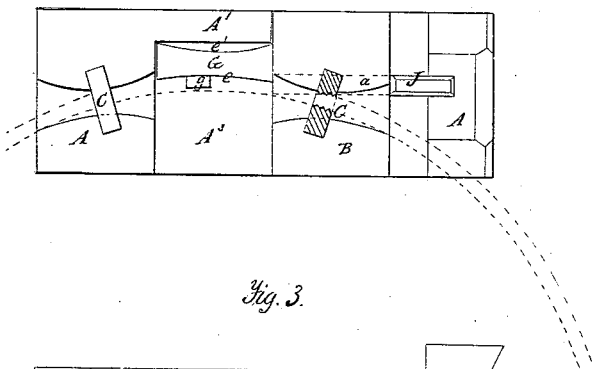
Fig. 2.
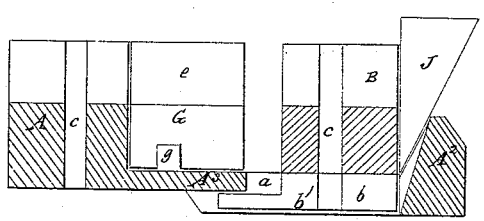
Fig. 3.
Fig. 4.
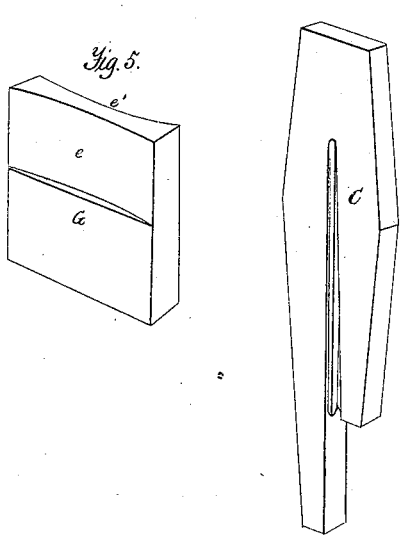
Fig. 5.
Fig. 6.
Witnesses.
R. Campbell.
Edw. Schafer.
Inventor.
J. M. Kellogg
by his Atty's
Mason, Fenwick & Lawrence

UNITED STATES PATENT OFFICE.

J. M. KELLOGG, OF DUQUOIN, ILLINOIS.

TIRE-SHRINKING MACHINE.

Specification forming part of Letters Patent No. 50,716, dated October 31, 1865.

*To all whom it may concern:*

Be it known that I, J. M. KELLOGG, of Duquoin, Perry county, State of Illinois, have invented a new and Improved Tire-Shrinking Machine; and I do hereby declare that the following is a full, clear, and exact description thereof, reference being had to the accompanying drawings, making a part of this specification, in which—

Figure 1 is a perspective view of my improved machine. Fig. 2 is a top view. Fig. 3 is a longitudinal section, showing the machine in a condition for commencing the shrinking of a tire. Fig. 4 is a similar view, showing the machine when the tire has been shrunk. Fig. 5 is a perspective view of the reversible block. Fig. 6 is a perspective view of one of the slotted keys.

Similar letters of reference indicate corresponding parts in the several figures.

This invention is intended for reducing the size of tires by shrinking the metal instead of cutting, lapping, and welding.

It consists in the combination of a fixed and a sliding jaw, with a concave back-support for the tire, said jaws being recessed in a peculiar manner to receive the tire, and provided with slotted binding-keys for confining the tire rigidly to both of them preparatory to the operation of shrinking or upsetting the tire, as will be hereinafter described.

It also consists in providing for the use of a wedge for moving the sliding jaw up to its work by so constructing the movable jaw and applying it to its bed-plate that it will be held firmly down thereon during the act of driving said wedge, as will be hereinafter described.

It also consists in a reversible concave back support for the tire for the purpose of adapting the machine to shrink tires of different diameters, and to afford a back support for a large as well as for a small tire, as will be hereinafter described.

To enable others skilled in the art to understand my invention, I will describe its construction and operation.

The main portion of the machine consists of a rectangular jaw or block, A, a vertical abutment, A', an end abutment, A², and a flat bed A³, all of which parts may be cast in one piece or made separately and bolted to the bed-plate, as represented in the drawings. That portion of the bed-plate A³ which extends beyond the vertical abutment A', including a portion of the end abutment, A², has a vertical slot, a, through them for receiving a tenon, b, and a tenon-hook, b', which are formed on the bottom of a movable jaw or block, B, which is similarly constructed to the jaw A. The hooked tenon b' projects forward and extends under the bed-plate, as shown in Figs. 3 and 4, for the purpose of aiding in keeping said movable jaw down upon the flat surface of the bed-plate, but allowing it to move freely backward or forward in a direction with the length of the slot a.

Each one of the jaws has a vertical slot formed in its upper part, the sides of which are convex for the purpose of admitting a tire into it edgewise, as indicated in Fig. 2. Each one of these jaws A B had also an opening, c, through it, which is equally divided on each side of the slot, for the purpose of receiving a slotted wedge-key, C, for clamping and firmly holding the tire. One of these keys C is shown in Fig. 6, where it will be seen that it is made in the form of a long wedge with a central slot, the edges of which are serrated or sharpened in such manner that they bite and hold the tire firmly between them when the key is driven into its place. A key of this description is used for each block by driving them into their holes astride of the tire. As the keys are driven into their respective jaws their forked ends are contracted against the tire in consequence of the wedge form of the keys.

G represents a narrow block, having concave surfaces e e', which is suitably secured against the vertical surface of the side abutment, A', as shown in Figs. 1 and 2. This block forms a back-support for the tire at the point of upsetting the metal thereof, and the concave surface of either side of this block is adapted to receive and to conform to the circular form of the tire. One of the surfaces e is for receiving the largest tires, and the curve of the opposite surface is made to conform to tires of smaller diameter. By reversing the block G either surface can be presented. A simple pin, g, inserted into the bed-plate A³, in front of the block G, will keep it in its place.

J represents a wedge-key, which is used for forcibly moving the jaw B toward the jaw A, when a tire is confined to these jaws, as shown in Fig. 2, for the purpose of compressing or shrinking the tire. This key J is guided by the vertical slot through the end of the abutment $A^2$, and through the bed-plate. One edge of the key impinges directly upon the vertical face of the jaw B, which is thus moved toward the jaw A as the key is driven downward.

The operation of my machine is as follows: The keys C C and wedge-key J are removed and the jaw B is properly adjusted. The back support or reversible block G is arranged with reference to the size of the tire, which it is desired to shrink, and the tire, which has been properly heated, is introduced edgewise into the recesses in the jaws, as indicated in red, Fig. 2. The two keys C C are now driven into their places for the purpose of securing the tire rigidly to the two jaws. The attendant now introduces the wedge J into the slot in the bed-plate between the jaw B and end abutment, A, and with a sledge-hammer he drives this wedge downward, which operation moves the jaw B toward the jaw A and upsets or shrinks the tire.

Having thus described my invention, what I claim as new, and desire to secure by Letters Patent, is—

1. The construction of the immovable slotted jaw $A'$, side abutment, $A^2$, slotted bed-plate $A^3$, and end abutment, $A^2$, in combination with a movable slotted jaw B, substantially as described.

2. The combination, with the subject-matter contained in the first claim, of the hooked tenon $b'$, and tenon-guide $b$, and wedge J, substantially as described.

3. The combination of the movable back support G with the side abutment, A, and jaws A B, substantially as described.

4. Adapting the concave-faced back support G to serve for tires of different diameters, substantially as described.

5. The use of forked and wedged keys C C for securing the tires to the jaws A B, substantially as described.

J. M. KELLOGG.

Witnesses:
   J. STURDEVANT,
   M. J. STURDEVANT.